March 28, 1944.  O. E. FISHBURN  2,345,250
SYNCHRONIZER
Filed Oct. 30, 1941

INVENTOR
Otto E. Fishburn.
ATTORNEYS.

Patented Mar. 28, 1944

2,345,250

UNITED STATES PATENT OFFICE 2,345,250

SYNCHRONIZER

Otto E. Fishburn, Detroit, Mich., assignor to Chrysler Corporation, Highland Park, Mich., a corporation of Delaware Application October 30, 1941, Serial No. 417,089

7 Claims. (Cl. 74—339)

This invention relates to synchronizers and more particularly to improvements in motor vehicle transmissions embodying engageable parts subject to clash-engagement.

One object of my invention is to provide means for synchronizing engageable transmission parts which do not lend themselves to conventional methods of synchronization.

Another object is to synchronize engageable transmission elements by bringing one of the elements to the speed of the other prior to their engagement, especially where such elements are ordinarily engaged at a time when the speed of one is zero and where the other element is subject to rotational drag or spin. With such an arrangement the synchronizer acts as a brake.

A further object is to provide a synchronizer for transmission elements adapted to be engaged when the vehicle is at a standstill. In many transmissions synchromesh mechanism is provided for speed ratio changes other than a drive ratio used to propel the vehicle from standstill. Because of the inertia of the transmission parts, clutch drag or spin, or other factors, clashing of the engageable parts frequently results, my invention being adapted to overcome such objections.

Further objects and advantages of my invention will be more apparent as this specification progresses, reference being made to the accompanying drawing illustrating one embodiment thereof and in which.

Figure 1:
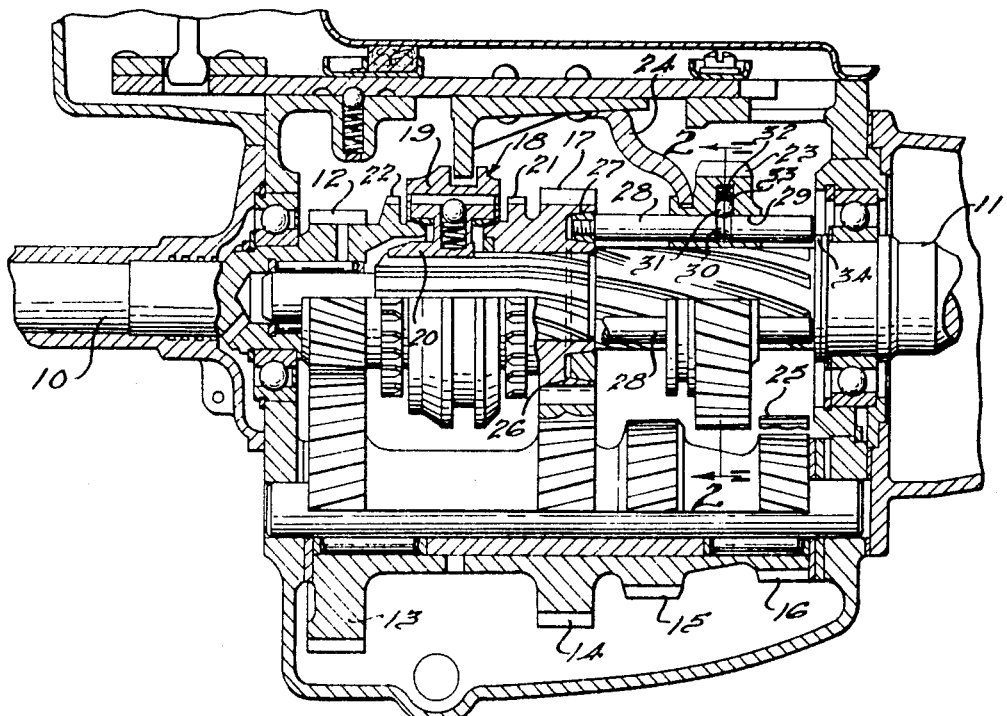
Fig. 1 is a longitudinal sectional elevational view through my transmission.
Figure 2:
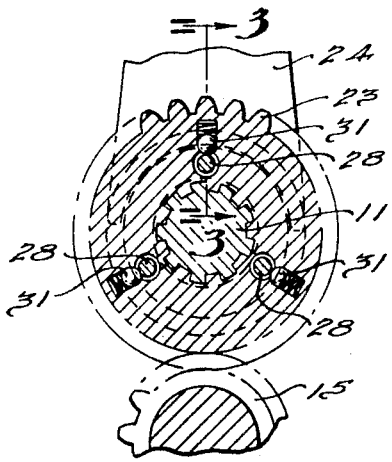
Fig. 2 is a transverse sectional view taken as indicated by line 2—2 of Fig. 1.
Figure 3:
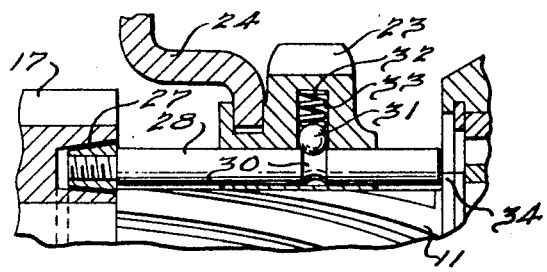
Fig. 3 is a fragmentary sectional view taken as indicated by line 3—3 of Fig. 2.

In order to illustrate the principles of my invention I have shown the same in connection with the low and reverse speed gear of a generally conventional transmission wherein provision is now made by me for synchronizing the engageable parts for driving the vehicle in a starting ratio—low or first forward speed in this instance.

The illustrated transmission comprises an input driving shaft 10 adapted to receive drive from the engine, usually with either a fluid coupling or clutch or both interposed between the engine and transmission according to standard practice. The output or driven shaft 11 transmits drive to the vehicle ground wheels in usual manner.

Shaft 10 is formed with a main drive pinion 12 in constant mesh with driving gear 13 of the driving countershaft cluster further comprising gears 14, 15 and 16. Gear 14 is in constant mesh with second speed gear 17 loose on shaft 11. A synchronizer shift mechanism of conventional design 18 is so arranged that when clutch sleeve 19 is shifted rearwardly then shaft 11 is coupled to gear 17 through hub 20, sleeve 19, and teeth 21 for second speed drive as follows: shaft 10, gears 12, 13, 14, 17, thence through mechanism 18 to shaft 11. When clutch sleeve 19 is shifted forwardly then shaft 10 is directly coupled to shaft 11 through teeth 22, sleeve 19, hub 20 for third speed or direct drive.

The low and reverse driven gear 23 is splined on shaft 11 and is shiftable forwardly by fork 24 to mesh with gear 15 for low or else rearwardly to mesh with a reverse idler driving gear 25 for a reverse drive, the idler being in constant mesh with gear 16. Both the low and reverse drives are vehicle starting drives and I have illustrated my invention in connection with the low drive which is as follows: shaft 10, gears 12, 13, 15, 23, to shaft 11. The reverse drive comprises shaft 10, gears 12, 13, 16, idler 25, gear 23, to shaft 11. In Fig. 1 gear 23 is shown in its neutral position.

I have provided means so arranged that, as an incident to shifting gear 23 preparatory to meshing with gear 15, the gear 15 is brought to rest so that a quiet engagement of the gears will result. In shifting for low, the vehicle is ordinarily at rest and therefore shaft 11 and gear 23 have zero rotational speed. At this time the main clutch is released but slight drag in the clutch or the inertia of the countershaft cluster and parts connected therewith tends to cause continued rotation of gear 15 ordinarily resulting in clash as gear 23 is shifted to mesh with gear 15. In order to prevent this clash I provide the following synchronizing braking mechanism.

Gear 17 is formed with a conical annular recess 26 in its rear face for receiving a similarly shaped annular ring 27 mounted on the forward ends of pins 28 which extend through holes 29 in the hub of gear 23. Each pin 28 has a detent 30 engaged, when gear 23 is in neutral, by a ball poppet 31 under pressure of spring 32 in radial recess 33 of gear 23.

When gear 23 is in neutral, there is a slight clearance between the inner and outer conical mating surfaces of ring 27 and recess 26. When gear 23 is shifted forwardly, this gear along with rods 28 and ring 27 move as a unit to immediately engage ring 27 with the conical walls of recess 26. The ring is forced into frictional engagement in this recess by an amount determined by detents 30 and the spring loaded balls 31, the rotation of gear 17 being immediately checked because shaft 11 and hence gear 23 and ring 27 are stationary at this time. Then, on further movement of gear 23, poppets 31 are forced outwardly and gear 23 is meshed without clash with gear 15 because when gear 17 is braked then the whole countershaft cluster and shaft 10 are all brought to rest. Even where shaft 11 has a small amount of rotation, shifting gear 23 forwardly will bring gear 15 nearly to the same rotational speed of gear 23, especially in comparison with the relatively greater difference in speeds of gears 15 and 23 under such conditions and because of clutch drag or inertia influence on the countershaft cluster.

As soon as poppets 31 break away from detents 30 then ring 27 is unloaded so as to prevent drag wear at ring 27 during the drive in low. The complete forward shift of gear 23 is practically continuous as the synchronizing action takes place very rapidly. When gear 23 is shifted back to neutral the parts are restored as in Fig. 1 with poppets 31 again engaging detents 30, this action being insured by limiting rearward movement of pins 28 by the stop at 34.

When gear 23 is shifted rearwardly for reverse, poppets 31 immediately leave detents 30, rods 28 remaining behind by reason of their engagement with stop 34. On returning gear 23 to neutral the detents are again engaged by the poppets. The poppets 31 will find the detents 30 and thereby properly position the pins 28 when gear 23 is returned to neutral from reverse and low, the shape of detents 30 being such as to bring this about in relation to the limited amount of end play in the pins 28 between stop 34 and recess 26.

I claim:

1. In a transmission having axially aligned driving and driven shafts; countershaft gearing adapted to be driven from said driving shaft and comprising a pair of countershaft gears; a first driven gear loose on the driven shaft and in constant mesh with one of said pair of countershaft gears; a clutch element drivingly connected with the driven shaft and adapted to clutch this shaft with said first driven gear thereby to provide a speed reduction drive from the driving shaft to the driven shaft; a second driven gear splined on the driven shaft and adapted for shift therealong to mesh with the other of said pair of countershaft gears thereby to provide another speed reduction drive from the driving shaft to the driven shaft; means operable to shift said second driven gear into and out of engagement with said other countershaft gear; and means operating as an incident to operation of said shift means for frictionally connecting said first driven gear with said second driven gear prior to engagement of said second driven gear with said second countershaft gear.

2. In a transmission according to claim 1; said friction connecting means comprising a friction element adapted to engage said first driven gear, and means providing a yielding connection between said friction element and said second driven gear.

3. In a transmission according to claim 1; said first driven gear being recessed, said friction connecting means comprising a friction element adapted to engage said recess of said first driven gear, a pin slidably mounted in said second driven gear and mounting said friction element, and means providing a yielding connection between said pin and said second driven gear.

4. In a transmission according to claim 1; said first driven gear having its hub formed with a conical surface recessed so as to underlie the teeth of this gear; said friction connecting means comprising a ring having a conical surface engageable with said recessed surface, and means providing an operating connection between said ring and said second driven gear.

5. In variable ratio power transmitting gearing, the combination of two parallel shafts carrying constantly meshing gears, one of which is capable of free rotation with respect to the shaft on which it is mounted; means for selectively locking said latter mentioned gear to its shaft; a gear slidably keyed on the shaft on which the freely rotatable gear is mounted, and a companion gear fixed on the other shaft with which the slidably keyed gear may intermesh when moved axially toward the freely rotatable gear; a friction clutch for frictionally coupling said freely rotatable gear to its shaft; means on said friction clutch reacting to an axial force applied to the slidably keyed gear for causing said friction clutch to seize prior to intermeshing of said slidable gear with its companion, said means for selective locking being independent of said clutch for frictionally coupling.

6. In variable ratio power transmitting gearing the combination of a driving and a driven shaft in parallel arrangement; a pair of constantly meshing gears on said shafts, that on the driven shaft being capable of rotation with respect thereto; means for selectively locking the rotatable gear to the driven shaft; a gear slidably keyed to the driven shaft and a companion gear fixed on the driving shaft arranged to intermesh with the slidably keyed gear when the latter is moved toward said gear that is capable of rotation with respect to the driven shaft; a friction clutch for frictionally coupling to the driven shaft said gear capable of rotation with respect thereto; cooperating means on said slidably keyed gear and said friction clutch for causing engagement of the friction clutch in response to the approaching movement of the slidably keyed gear toward its companion on the driving shaft, said means for selective locking being independent of said clutch for frictionally coupling.

7. In variable ratio power transmitting gearing the combination of a main driven shaft and a parallel countershaft; a gear on the main driven shaft capable of rotating freely thereon and a gear fixed to the countershaft in constant mesh with said gear on the driven shaft; means for selectively locking said freely rotatable gear to said driven shaft to complete one train of gearing; a pair of intermeshable gears, one of which is fixed to the countershaft and the other slidably keyed to the driven shaft, said gears when intermeshed completing a train of gearing of lower ratio than that completed by the selective locking of said freely rotatable gear to the driven shaft; a friction clutch for frictionally coupling the freely rotatable gear to the main driven shaft; cooperating means on said slidably keyed gear and said friction clutch for causing said friction clutch to engage in response to the approaching movement of the slidably keyed gear toward its companion on the countershaft.

OTTO E. FISHBURN.